United States Patent
Wang et al.

(10) Patent No.: US 11,695,609 B2
(45) Date of Patent: Jul. 4, 2023

(54) SIDE INFORMATION TRANSMISSION METHOD BASED ON PARTIAL TRANSMIT SEQUENCE TECHNOLOGY, AND APPARATUS

(71) Applicant: Huawei Technologies Co., Ltd., Shenzhen (CN)

(72) Inventors: Xiaolu Wang, Hangzhou (CN); Hejia Luo, Hangzhou (CN); Rong Li, Hangzhou (CN); Bin Wang, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/514,562

(22) Filed: Oct. 29, 2021

(65) Prior Publication Data

US 2022/0052896 A1 Feb. 17, 2022

Related U.S. Application Data

(63) Continuation of application No. PCT/CN2020/087388, filed on Apr. 28, 2020.

(30) Foreign Application Priority Data

Apr. 30, 2019 (CN) .......................... 201910363453.3

(51) Int. Cl.
*H04L 27/26* (2006.01)

(52) U.S. Cl.
CPC ........ *H04L 27/2621* (2013.01); *H04L 27/265* (2013.01); *H04L 27/2628* (2013.01)

(58) Field of Classification Search
CPC ............. H04L 27/2601; H04L 27/2614; H04L 27/2615; H04L 27/2617; H04L 27/2618;
(Continued)

(56) References Cited

U.S. PATENT DOCUMENTS

| | | | | |
|---|---|---|---|---|
| 5,625,651 A | * | 4/1997 | Cioffi | .................... H04L 1/0025 |
| | | | | 370/506 |
| 7,315,580 B2 | * | 1/2008 | Feng | .................. H04L 27/2621 |
| | | | | 375/295 |

(Continued)

FOREIGN PATENT DOCUMENTS

| | | |
|---|---|---|
| CN | 1522511 A | 8/2004 |
| CN | 101340417 A | 1/2009 |

(Continued)

OTHER PUBLICATIONS

Huawei et al., "Discussion on PAPR in NTN," R1-1904712, 3GPP TSG RAN WG1 Meeting #96bis, Xian, China, Apr. 8-12, 2019, 7 pages.

*Primary Examiner* — James M Perez
(74) *Attorney, Agent, or Firm* — Conley Rose, P.C.

(57) ABSTRACT

A side information transmission method and apparatus, where data to be transmitted by a transmit end includes at least one first data sub-block and at least one second data sub-block. A first modulated signal is obtained based on a first phase rotation factor. A second modulated signal is obtained based on a second phase rotation factor. Side information is generated based on the first phase rotation factor and the second phase rotation factor. The first data sub-block is carried on a first subcarrier, and the side information is also mapped to the first carrier. The first modulated signal corresponding to the at least one first data sub-block, the second modulated signal corresponding to the at least one second data sub-block, and a modulated signal corresponding to the side information are superposed to obtain a to-be-transmitted signal.

20 Claims, 12 Drawing Sheets

(58) Field of Classification Search
CPC ............. H04L 27/2621; H04L 27/2628; H04L 27/265; H04L 27/26522; H04L 27/26524
See application file for complete search history.

(56) References Cited

U.S. PATENT DOCUMENTS

| | | | | |
|---|---|---|---|---|
| 7,321,629 B2* | 1/2008 | Feng | ..................... | H04L 1/0041 375/259 |
| 7,342,978 B2* | 3/2008 | Feng | ..................... | H04L 27/2621 375/295 |
| 7,672,392 B2* | 3/2010 | Johansson | ......... | H04L 25/03343 332/120 |
| 7,848,446 B2* | 12/2010 | Haartsen | ............. | H04L 27/2614 375/285 |
| 7,864,875 B2* | 1/2011 | Qu | ..................... | H04L 27/2626 375/297 |
| 7,929,511 B2* | 4/2011 | Kwon | ............... | H04L 27/26522 370/344 |
| 7,995,602 B2* | 8/2011 | Cimini, Jr. | .......... | H04L 27/2615 370/430 |
| 8,000,421 B2* | 8/2011 | Takano | ................ | H04B 7/0842 375/349 |
| 8,009,553 B2* | 8/2011 | Koyanagi | ........... | H04L 27/2621 370/208 |
| 8,050,354 B2* | 11/2011 | Qu | ..................... | H04L 27/2615 375/297 |
| 8,098,776 B2* | 1/2012 | Kent | ................... | H04L 25/0214 375/232 |
| 8,102,927 B2* | 1/2012 | Kim | ................... | H04L 27/2615 375/261 |
| 8,218,521 B2* | 7/2012 | Koyanagi | ........... | H04L 27/2624 370/344 |
| 8,335,268 B2* | 12/2012 | Lee | ....................... | H04L 5/0023 375/267 |
| 8,571,000 B2* | 10/2013 | Zhou | .................. | H04L 27/2621 370/344 |
| 8,693,563 B2* | 4/2014 | Hwang | ................ | H04L 1/0625 375/267 |
| 8,774,315 B2* | 7/2014 | Cahn | ...................... | H04L 27/12 375/306 |
| 8,891,674 B2* | 11/2014 | Park | ................... | H04L 27/2618 375/268 |
| 8,995,568 B1* | 3/2015 | Wu | ....................... | H04K 1/006 375/295 |
| 9,848,342 B1* | 12/2017 | McCallister | .......... | H04W 52/52 |
| 10,069,666 B2* | 9/2018 | Lin | ..................... | H04L 27/2626 |
| 10,091,041 B2* | 10/2018 | Tanahashi | ............. | H04B 1/04 |
| 10,263,664 B2* | 4/2019 | Sun | ..................... | H04M 11/062 |
| 10,270,636 B2* | 4/2019 | Tanahashi | ................ | H04J 11/00 |
| 10,320,076 B2* | 6/2019 | Fang | ........................ | F16H 1/32 |
| 10,587,448 B2* | 3/2020 | Shimizu | ............... | H04J 11/0059 |
| 10,721,111 B2* | 7/2020 | Liu | ..................... | H04L 27/36 |
| 10,736,081 B2* | 8/2020 | Wu | ....................... | H04L 5/0094 |
| 10,879,785 B2* | 12/2020 | Shuai | .................. | H02M 7/5387 |
| 10,917,275 B2* | 2/2021 | Shen | ....................... | H04L 27/26 |
| 10,979,166 B2* | 4/2021 | Shen | ................ | H04L 25/03828 |
| 11,368,348 B2* | 6/2022 | Hu | ....................... | H04L 27/2636 |
| 11,516,749 B2* | 11/2022 | Scholand | ............ | H04W 52/225 |
| 2003/0202460 A1* | 10/2003 | Jung | ................... | H04L 27/2621 370/480 |
| 2004/0008616 A1* | 1/2004 | Jung | ................... | H04L 27/2621 370/343 |
| 2004/0093545 A1* | 5/2004 | Khandani | ............. | H04L 1/0058 714/746 |
| 2004/0146115 A1* | 7/2004 | Feng | ................... | H04L 27/2618 375/260 |
| 2005/0286648 A1* | 12/2005 | Feng | ................... | H04L 27/2621 375/260 |
| 2006/0120268 A1* | 6/2006 | Bar-Ness | ............ | H04L 27/3411 370/208 |
| 2007/0153932 A1* | 7/2007 | Cimini, Jr. | .......... | H04L 27/2626 375/260 |
| 2007/0217329 A1* | 9/2007 | Abedi | ................... | H04L 5/0044 370/480 |
| 2008/0285673 A1* | 11/2008 | Han | ..................... | H04L 27/2621 375/260 |
| 2009/0003478 A1* | 1/2009 | Kim | ................... | H04L 27/2614 375/260 |
| 2009/0060070 A1* | 3/2009 | Hayase | .................. | H04L 5/006 375/296 |
| 2009/0080454 A1* | 3/2009 | Koyanagi | ........... | H04L 27/2621 370/445 |
| 2012/0294346 A1* | 11/2012 | Kolze | ................. | H04L 27/2614 375/342 |
| 2014/0362934 A1* | 12/2014 | Kumar | ................ | H04L 27/2602 375/295 |
| 2016/0119940 A1* | 4/2016 | Wang | ................... | H04W 72/12 370/329 |
| 2016/0143011 A1* | 5/2016 | Xia | ....................... | H04L 1/0031 370/330 |
| 2016/0198446 A1* | 7/2016 | Wild | ..................... | H04L 5/0066 370/330 |
| 2016/0269219 A1* | 9/2016 | Wang | ................... | H04L 27/2621 |
| 2018/0145582 A1* | 5/2018 | Shuai | ..................... | H02M 1/32 |
| 2019/0027825 A1* | 1/2019 | Fang | ..................... | H01Q 1/1264 |
| 2020/0007372 A1* | 1/2020 | Shen | ................... | H04L 5/0005 |
| 2020/0014482 A1* | 1/2020 | Shen | ................... | H04L 25/022 |
| 2020/0112467 A1* | 4/2020 | Shen | ................... | H04L 27/2621 |
| 2020/0350932 A1* | 11/2020 | Chen | ................... | H04L 1/1867 |
| 2021/0067392 A1* | 3/2021 | Abdoli | ............... | H04L 27/2621 |
| 2021/0136699 A1* | 5/2021 | Scholand | ............... | H04W 4/40 |
| 2022/0052896 A1* | 2/2022 | Wang | ................... | H04L 27/2621 |
| 2022/0217029 A1* | 7/2022 | Wang | ................... | H04L 27/2621 |

FOREIGN PATENT DOCUMENTS

| | | |
|---|---|---|
| CN | 106789828 A | 5/2017 |
| CN | 108566355 A | 9/2018 |
| WO | 2004109953 A1 | 12/2004 |

\* cited by examiner

SIDE INFORMATION TRANSMISSION METHOD BASED ON PARTIAL TRANSMIT SEQUENCE TECHNOLOGY, AND APPARATUS

CROSS-REFERENCE TO RELATED APPLICATIONS

This application is a continuation of International Patent Application No. PCT/CN2020/087388, filed on Apr. 28, 2020, which claims priority to Chinese Patent Application No. 201910363453.3, filed on Apr. 30, 2019. The disclosures of the aforementioned applications are hereby incorporated by reference in their entireties.

TECHNICAL FIELD

Embodiments of this application pertain to the field of wireless communications technologies, and more specifically, relate to a side information transmission method based on a partial transmit sequence technology, and an apparatus.

BACKGROUND

In a broadband communications system, to overcome frequency selective multipath fading, an entire system bandwidth is generally divided into a plurality of sub-bands. It may be considered that flat fading is implemented for each sub-band. In this way, a receiver can perform frequency domain equalization using a simple linear frequency domain equalizer, to implement relatively high receive performance. A system in which a broadband signal is divided into a plurality of narrowband signals in frequency domain for transmission and reception is referred to as a multicarrier system. An orthogonal frequency-division multiple access (OFDMA) system is a typical multicarrier system. Complexity of performing equalization by the receiver is reduced in the multicarrier system. However, the multicarrier system also has a serious disadvantage, that is, a relatively high peak-to-average power ratio (PAPR). Because an output signal of the system is superposition of a plurality of sub-channel signals, when phases of a plurality of signals are consistent at a moment, an instantaneous power of the obtained superposed signal is far greater than an average power of the signals, thereby causing a relatively large peak-to-average power ratio. The PAPR greatly affects efficiency of a power amplifier. When the PAPR is low, it can be ensured that an operation point of the power amplifier is always in an optimal amplification range, to implement optimal efficiency of the power amplifier. When the PAPR is high, to ensure that a peak signal can be normally amplified, the operation point of the power amplifier needs to be reduced. In other words, the operation point of the power amplifier is reduced. In this case, efficiency of the power amplifier is also reduced. In addition, an average power of transmit signals is reduced, thereby reducing a transmission distance of a wireless signal.

In cellular network communication or satellite communication, a high-power amplifier (HPA) of a sending device is required to operate near a linear saturation region. To reduce the PAPR, a conventional solution is to reduce a power of a signal input to the HPA. However, this reduces a power of a signal output by the HPA and power efficiency of the HPA. In the current technology, many different PAPR reduction technologies are proposed. These technologies may be roughly classified into three types: a signal predistortion technology, an encoding technology, and a probability technology. A solution of the probability technology focuses on reducing a probability that a peak value appears rather than reducing a maximum value of a signal amplitude. A reason for a relatively large peak value of an orthogonal frequency division multiplexing (OFDM) signal is superposition of a plurality of subcarrier signals. If a plurality of sequences can be used to indicate the same group of to-be-transmitted information, a proper group of sequences may be selected for transmission when a threshold is given, thereby reducing the probability that the peak value appears. A method based on the probability technology includes selective mapping (SLM), a partial transmit sequence (PTS), pulse shaping (PS), and the like. These methods based on the probability technology may be collectively referred to as a linear PAPR reduction method. A sequence (or referred to as a phase factor) used to reduce the probability that the peak value of a signal appears is referred to as side information (SI). It may be learned that in the current technology, the PAPR problem of the OFDM signal can be overcome using the side information. However, how to improve transmission efficiency of side information and spectral efficiency of a system still needs to be studied while the PAPR is suppressed.

SUMMARY

This application provides a side information transmission method based on a partial transmit sequence technology, and an apparatus, to efficiently transmit side information without occupying an additional spectrum resource.

According to a first aspect, a side information transmission method based on a partial transmit sequence technology is provided. The method includes: obtaining to-be-transmitted data, where the to-be-transmitted data includes at least one first data sub-block and at least one second data sub-block, the first data sub-block is carried on a first subcarrier, and the second data sub-block is carried on a second subcarrier; obtaining a first modulation signal and a second modulation signal, where the first modulation signal is obtained based on a first phase rotation factor, the second modulation signal is obtained based on a second phase rotation factor, the first phase rotation factor is a phase rotation factor in a first phase rotation factor set, and the second phase rotation factor is a phase rotation factor in a second phase rotation factor set; and generating side information based on the first phase rotation factor and the second phase rotation factor; obtaining a side information modulation signal, where the side information is mapped to the first subcarrier, and the side information modulation signal is obtained based on the mapped side information; and generating a to-be-transmitted signal, where the to-be-transmitted signal is obtained by superposing the side information modulation signal, the first modulation signal, and the second modulation signal.

It can be learned that, first, a phase rotation factor is selected from a phase rotation factor set, such that a PAPR value of a multicarrier signal can be minimized. The side information including the phase rotation factors is superposed on the carrier of the first-type data sub-block for transmission without additionally occupying a spectrum resource. In addition, it is verified through simulation experiments that this solution has better decoding performance than the current technology.

A classification method and a segmentation method for a data sub-block are the same between a receive end and a transmit end. The first-type data sub-block and the second-type data sub-block are classified based on whether a phase rotation factor is selected from the first phase rotation factor set or the second phase rotation factor set. In another aspect, the transmit end and the receive end also agree on a segmentation manner for a data sub-block.

With reference to the first aspect, in some possible implementations of the first aspect, the method includes: before the obtaining a first modulation signal and a second modulation signal, performing inverse discrete Fourier transform (IDFT) on the first data sub-block and the second data sub-block, to obtain the first data sub-block obtained after the IDFT and the second data sub-block obtained after the IDFT.

With reference to the first aspect, in some possible implementations of the first aspect, the side information modulation signal is obtained after IDFT is performed on the mapped side information.

With reference to the first aspect, in some possible implementations of the first aspect, a length of the first data sub-block and the second data sub-block is equal to a length of the to-be-transmitted data. The first data sub-block and the second data sub-block each include N/V pieces of data. Remaining (N−N/V) data locations of each of the first data sub-block and the second data sub-block are filled with zero. Herein, N is the length of the to-be-transmitted data, V is a sum of a quantity of first data sub-blocks and a quantity of second data sub-blocks included in the to-be-transmitted data, and/(forward slash symbol) represents a division sign.

With reference to the first aspect, in some possible implementations of the first aspect, the method further includes: determining a power allocation factor of the first data sub-block based on a channel status and constellation mapping manner information.

Optionally, in some possible embodiments, the first phase rotation factor set is {+1, −1, +i, −i} or a subset of {+1, −1, +i, −i}. Herein, i is a square root of −1.

Optionally, in some possible embodiments, the second phase rotation factor set is {e^(iπ/4), e^(i3π/4), e^(i5π/4), e^(i7π/4)} or a subset of {e^(iπ/4), e^(i3π/4), e^(i5π/4), e^(i7π/4)}. Herein, i is a square root of −1.

With reference to the first aspect, in some possible implementations of the first aspect, the method further includes: determining a power allocation factor of the side information modulation signal based on a channel status and constellation mapping manner information. This implementation can help divide a synthesized signal, to accurately extract the side information modulation signal.

With reference to the first aspect, in some possible implementations of the first aspect, the method further includes: performing channel encoding and serial-to-parallel conversion on the to-be-transmitted data.

According to a second aspect, a side information reception method based on a partial transmit sequence technology is provided. The method includes: receiving a signal sent by a transmit end, where the signal sent by the transmit end includes first data sub-block information, second data sub-block information, and side information, the first data sub-block information and the side information are carried on a first subcarrier, and the second data sub-block information is carried on a second subcarrier; and obtaining the side information, where the side information is obtained by performing constellation demapping on a signal carried on the first subcarrier, and the side information includes a first phase rotation factor and a second phase rotation factor.

It can be learned that, first, a phase rotation factor is selected, such that a PAPR value of a multicarrier signal can be minimized. The side information including the phase rotation factors is superposed on the carrier of the first-type data sub-block for transmission without additionally occupying a spectrum resource. In addition, it is verified through simulation experiments that this solution has better decoding performance than the current technology.

With reference to the second aspect, in some possible implementations of the second aspect, the method further includes: performing serial-to-parallel conversion on the received signal sent by the transmit end, and performing discrete Fourier transform (DFT) on the signal sent by the transmit end to obtain data obtained after the DFT.

With reference to the second aspect, in some possible implementations of the second aspect, a length of the first data sub-block information and the second data sub-block information is equal to a length of the data obtained after the DFT. The first data sub-block information and the second data sub-block information each include N/V pieces of data. Herein, N is the length of the signal sent by the transmit end, V is a quantity of pieces of the first data sub-block information and the second data sub-block information included in the signal sent by the transmit end, and/represents a division sign.

According to a third aspect, a wireless communications apparatus is provided. The apparatus includes: an obtaining unit configured to obtain to-be-transmitted data, where the to-be-transmitted data includes at least one first data sub-block and at least one second data sub-block, the first data sub-block is carried on a first subcarrier, and the second data sub-block is carried on a second subcarrier; a modulation unit configured to obtain a first modulation signal and a second modulation signal, where the first modulation signal is obtained based on a first phase rotation factor, the second modulation signal is obtained based on a second phase rotation factor, the first phase rotation factor is a phase rotation factor in a first phase rotation factor set, and the second phase rotation factor is a phase rotation factor in a second phase rotation factor set; a side information generation unit configured to generate side information based on the first phase rotation factor and the second phase rotation factor; a side information modulation unit configured to obtain a side information modulation signal, where the side information is mapped to the first subcarrier, and the side information modulation signal is obtained based on the mapped side information; and a combination unit configured to generate a to-be-transmitted signal, where the to-be-transmitted signal is obtained by superposing the side information modulation signal, the first modulation signal, and the second modulation signal.

With reference to the third aspect, in some possible implementations of the third aspect, the apparatus further includes: a transform unit configured to: before the first modulation signal and the second modulation signal are obtained, perform IDFT on the first data sub-block and the second data sub-block, to obtain the first data sub-block obtained after the IDFT and the second data sub-block obtained after the IDFT.

With reference to the third aspect, in some possible implementations of the third aspect, the side information modulation signal is obtained after IDFT is performed on the mapped side information.

With reference to the third aspect, in some possible implementations of the third aspect, a length of the first data sub-block and the second data sub-block is equal to a length of the to-be-transmitted data. The first data sub-block and the second data sub-block each include N/V pieces of data. Remaining (N−N/V) data locations of each of the first data sub-block and the second data sub-block are filled with zero. Herein, N is the length of the to-be-transmitted data, and V is a sum of a quantity of first data sub-blocks and a quantity of second data sub-blocks included in the to-be-transmitted data.

With reference to the third aspect, in some possible implementations of the third aspect, the apparatus further includes: a power allocation unit configured to determine a power allocation factor of the side information modulation signal based on a channel status and a constellation mapping manner.

With reference to the third aspect, in some possible implementations of the third aspect, the first phase rotation factor set is {+1, −1, +i, −i} or a subset of {+1, −1, +i, −i}. Herein, i is a square root of −1.

With reference to the third aspect, in some possible implementations of the third aspect, the second phase rotation factor set is {e^(iπ/4), e^(i3π/4), e^(i5π/4), e^(i7π/4)} or a subset of {e^(iπ/4), e^(i3π/4), e^(i5π/4), e^(i7π/4)}. Herein, i is a square root of −1.

With reference to the third aspect, in some possible implementations of the third aspect, the apparatus further includes: a second power allocation unit configured to determine a power allocation factor of the side information modulation signal based on a channel status and a constellation mapping manner.

With reference to the third aspect, in some possible implementations of the third aspect, the apparatus further includes: an encoding unit configured to perform channel encoding and serial-to-parallel conversion on the to-be-transmitted data.

According to a fourth aspect, a wireless communications apparatus is provided. The wireless communications apparatus includes: a receiving unit configured to receive a signal sent by a transmit end, where the signal sent by the transmit end includes first data sub-block information, second data sub-block information, and side information, the first data sub-block information and the side information are carried on a first subcarrier, and the second data sub-block information is carried on a second subcarrier; and a side information obtaining unit configured to obtain the side information, where the side information is obtained by performing constellation demapping on a signal carried on the first subcarrier, and the side information includes a first phase rotation factor and a second phase rotation factor.

With reference to the fourth aspect, in some possible implementations of the fourth aspect, the apparatus further includes: a transform unit configured to: perform serial-to-parallel conversion on the received signal sent by the transmit end, and perform DFT on the signal sent by the transmit end to obtain data obtained after the DFT.

With reference to the fourth aspect, in some possible implementations of the fourth aspect, a length of the first data sub-block information and the second data sub-block information is equal to a length of the data obtained after the DFT. The first data sub-block information and the second data sub-block information each include N/V pieces of data. Herein, N is the length of the signal sent by the transmit end, V is a quantity of pieces of the first data sub-block information and the second data sub-block information included in the signal sent by the transmit end, and/represents a division sign.

According to a fifth aspect, a wireless communications apparatus is provided, including: a processor configured to execute a program stored in a memory. When the program is executed, the apparatus is enabled to perform the side information transmission method in the first aspect and the possible implementations of the first aspect or in the second aspect and the possible implementations of the second aspect.

With reference to the fifth aspect, in some possible implementations of the fifth aspect, the decoding apparatus further includes a memory configured to store data generated or used by the processor in a process of performing the method in the first aspect and the possible implementations of the first aspect or in the second aspect and the possible implementations of the second aspect.

With reference to the fifth aspect, in some possible implementations of the fifth aspect, the memory is disposed outside the apparatus. The memory may be a physically independent unit, or may be storage space on a cloud server, or a network hard disk.

With reference to the fifth aspect, in some possible implementations of the fifth aspect, the memory is located in the apparatus.

With reference to the fifth aspect, in some possible implementations of the fifth aspect, the memory and the processor are integrated.

With reference to the fifth aspect, in some possible implementations of the fifth aspect, the processor may be a chip or an integrated circuit.

According to a sixth aspect, a non-transitory computer readable storage medium is provided. The computer readable storage medium stores computer program instructions. When the instructions are run on a computer, the computer is enabled to perform the method in the first aspect or any possible implementation of the first aspect, or the computer is enabled to perform the method in the second aspect or any possible implementation of the second aspect.

According to a seventh aspect, a computer program product including instructions is provided. The computer program product includes computer program code. When the computer program code is run on a computer, the computer is enabled to perform the method in the first aspect or any possible implementation of the first aspect, or the computer is enabled to perform the method in the second aspect or any possible implementation of the second aspect.

According to an eighth aspect, a communications system is provided, including a wireless communications apparatus for sending data and a wireless communications apparatus for receiving a signal in the foregoing aspects.

In the embodiments of this application, the data to be transmitted by the transmit end includes at least one first data sub-block and at least one second data sub-block. The side information including the phase rotation factors is mapped to the carrier of the first data sub-block. Then, the modulation signals of the first and second data sub-blocks and the side information modulation signal are superposed and sent. After receiving the signal sent by the transmit end, the receive end extracts the side information including the phase rotation factors used by the transmit end, to decode the data. In the method, the phase rotation factor is selected, such that a PAPR value of a multicarrier signal can be minimized. In addition, the side information including the phase rotation factors is sent using the subcarrier carrying the data sub-block. In comparison with the current technology, the side information can be efficiently transmitted in the method without additionally occupying a spectrum resource. The method has good bit error rate (BER) performance in decoding the side information.

DESCRIPTION OF EMBODIMENTS

The following describes this application in detail with reference to the accompanying drawings and embodiments.

Terminologies such as "component", "module", and "system" used in this application are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in figures, both a computing device and an application that is run on a computing device may be components. One or more components may reside within a process and/or a thread of execution, and a component may be located on one computer and/or distributed between two or more computers. In addition, these components may be executed from various computer-readable media that store various data structures. For example, the components may communicate using a local and/or remote process and according to, for example, a signal having one or more data packets (for example, data from two components interacting with another component in a local system, a distributed system, and/or across a network such as the Internet interacting with other systems using the signal).

It should be noted that numbers of steps in the method embodiment of this application has only a function of identifying the steps in the method, and does not limit a sequence between the numbered steps.

Figure 1:
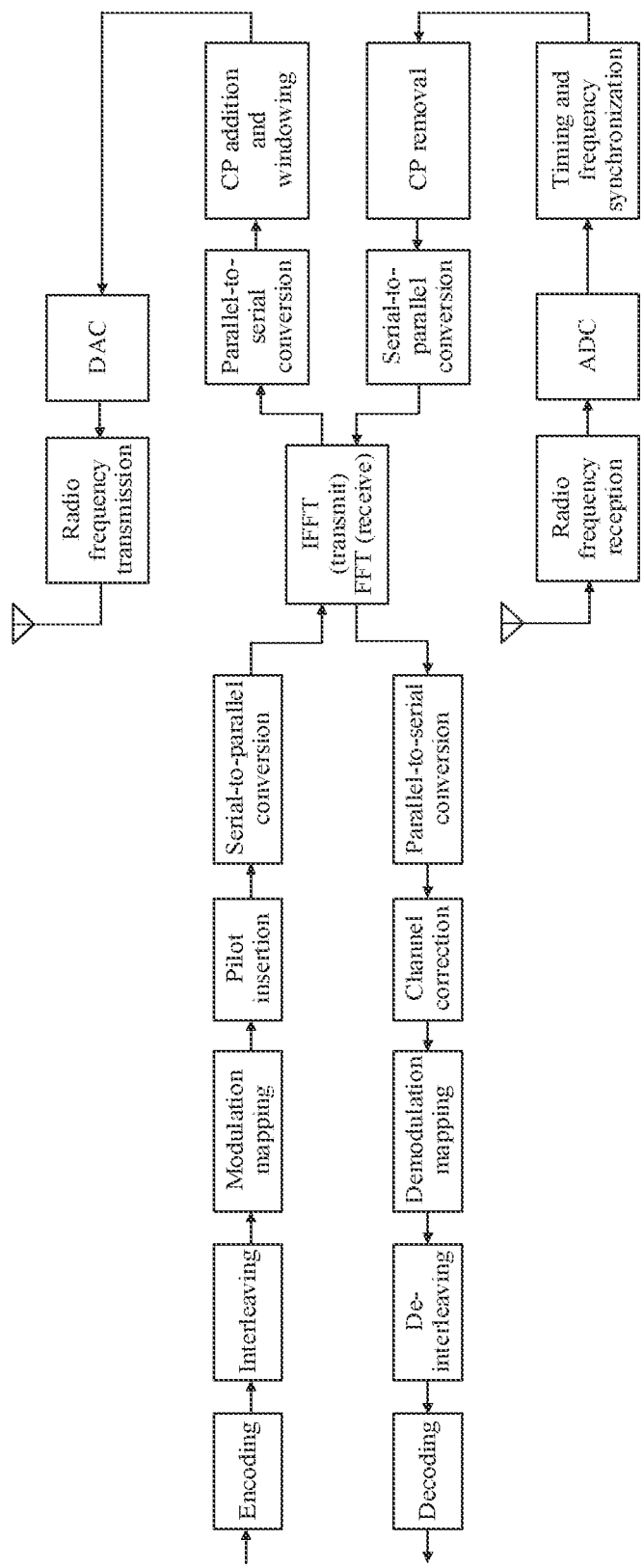
FIG. 1 is a schematic flowchart of a wireless OFDM system applicable to the technical solutions of this application.

FIG. 1 is a schematic flowchart of a wireless OFDM system applicable to the technical solutions of this application. A schematic flowchart on an OFDM transmit end is provided in an upper part of FIG. 1. A procedure of the transmit end includes encoding, interleaving, modulation mapping, pilot insertion, serial-to-parallel conversion, inverse discrete Fourier transform (IDFT), parallel-to-serial conversion, cyclic prefix (CP) addition and windowing, digital-to-analog conversion (DAC), and transmission (radio frequency transmission in FIG. 1). A schematic flowchart of an OFDM receive end is provided in a lower part. A procedure includes reception (radio frequency reception in FIG. 1), an analog-to-digital conversion (ADC), timing and frequency synchronization, CP removal, serial-to-parallel conversion, discrete Fourier transform (DFT), parallel-to-serial conversion, channel correction, demodulation mapping, de-interleaving, and decoding. A sequence of the foregoing procedures is not strictly limited. The procedures may be combined. In addition, a process that constitutes a system function may be added or removed according to a specific requirement of a system.

It is easy to understand that the foregoing typical architecture is merely used as an example. The technical solutions of this application may be further used in various communications technologies using OFDM, for example, an optical orthogonal frequency division multiplexing (O-OFDM) technology. The foregoing examples do not constitute a limitation on the technical solutions of this application. In addition, generally, a communications device includes a transmit apparatus for sending a signal and a receive apparatus for receiving a signal, that is, includes a transmit apparatus and a receive apparatus shown in FIG. 1. However, this application sets no limitation thereto. One communications device may include only a transmit apparatus or a receive apparatus.

The transmit end converts a to-be-transmitted digital signal into a subcarrier amplitude and phase through mapping, performs inverse discrete Fourier transform, transforms data into time domain, and finally transmits the processed signal outside through radio frequency. A process of the receive end is contrary to that of the transmit end. The receive end performs discrete Fourier transform (DFT) on a received signal, obtains a frequency domain signal through decomposing, and then converts the carrier amplitude and phase into a digital signal through inverse mapping. In recent years, with the development of ultra-large-scale integrated circuits, high-speed and large-capacity chips are very common. These high-speed chips implement inverse fast Fourier transform and fast Fourier transform (IFFT/FFT), such that modulation and demodulation of an OFDM signal become very fast and effective.

Figure 2:
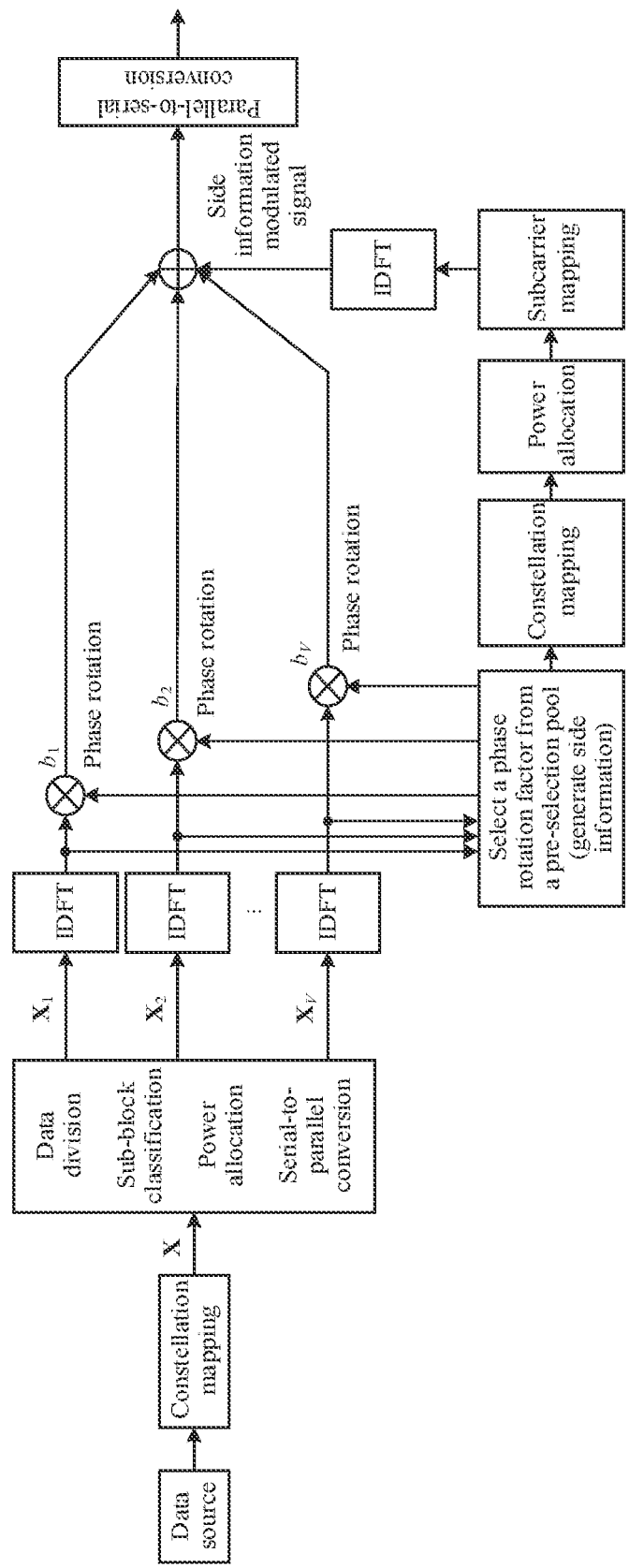
FIG. 2 is a schematic flowchart of a side information transmission method based on a partial transmit sequence technology on a transmit end.

This application provides a side information transmission method based on a partial transmit sequence technology, to reduce a peak-to-average power ratio. FIG. 2 is a schematic flowchart of a transmit end in the method. The method may be applied to a signal sending device or apparatus, or a transmit apparatus such as a processing module or a chip required for sending a signal. The procedure of the transmit end includes constellation mapping, data segmentation, data sub-block classification, power allocation, serial-to-parallel conversion, IDFT, phase factor selection, constellation mapping, power allocation, subcarrier mapping, IDFT, summation, parallel-to-serial conversion, and the like.

Figure 3:
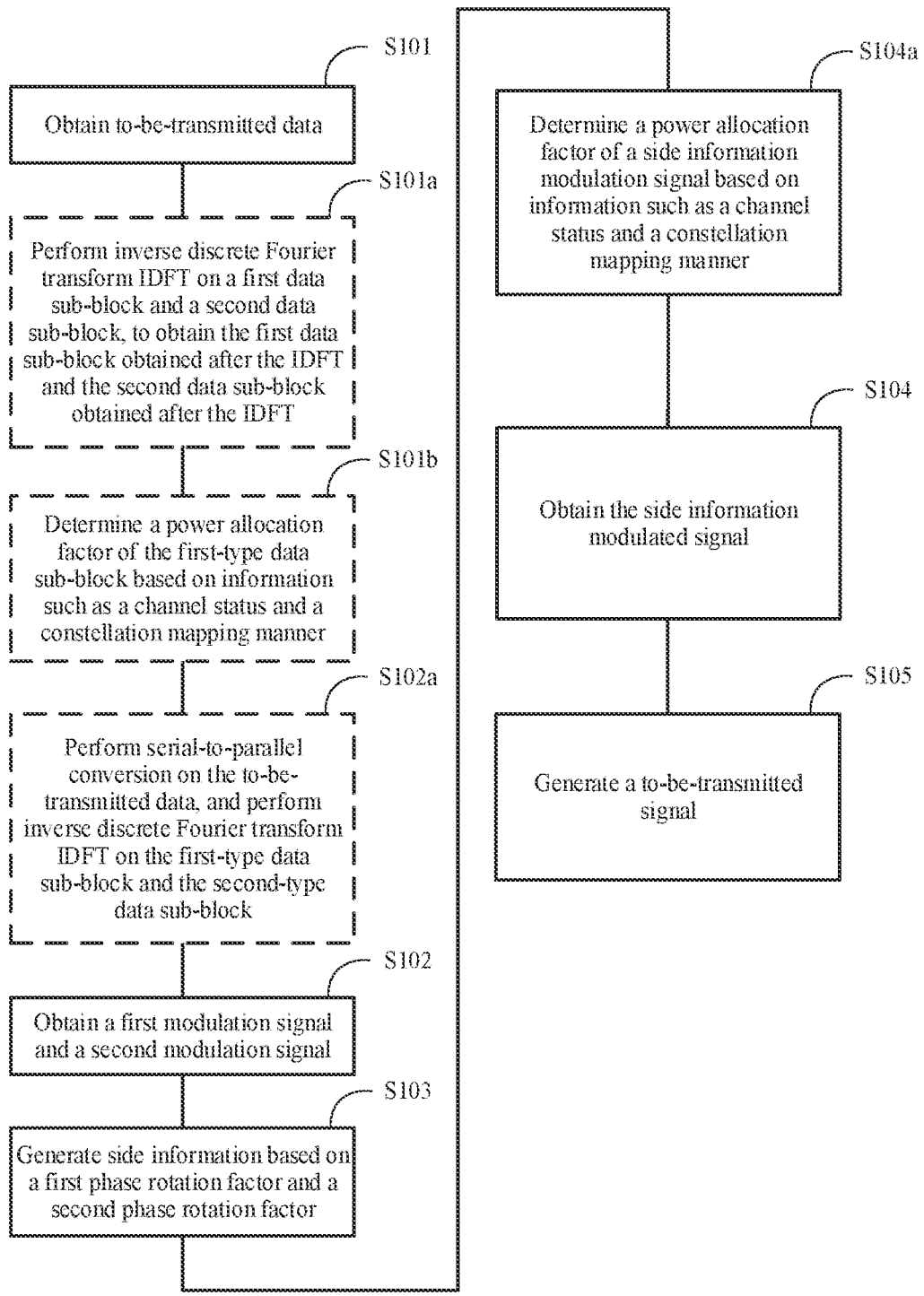
FIG. 3 is a block diagram of a side information transmission method based on a partial transmit sequence technology according to this application.

FIG. 3 is a block diagram of a side information transmission method based on a partial transmit sequence technology according to this application. The method is mainly performed by a transmit end. The method mainly includes the following steps.

S101. Obtain to-be-transmitted data. The to-be-transmitted data includes at least one first-type data sub-block and at least one second-type data sub-block. The first-type data sub-block is carried on a first subcarrier. The second-type data sub-block is carried on a second subcarrier. A phase rotation factor in a first phase rotation factor set is selected for the first-type data sub-block to perform phase rotation. A phase rotation factor in a second phase rotation factor set is selected for the second-type data sub-block to perform phase rotation.

For ease of description, in this application document, the first-type data sub-block may be referred to as a first data sub-block, and the first data sub-block may be referred to as the first-type data sub-block. The first data sub-block and the first-type data sub-block may be used interchangeably. Similarly, the second-type data sub-block and a second data sub-block may also be referred to as each other.

S102. Obtain a first modulation signal and a second modulation signal. The first modulation signal is obtained based on the first phase rotation factor. The second modulation signal is obtained based on the second phase rotation factor. The first phase rotation factor is a phase rotation factor in the first phase rotation factor set. The second phase rotation factor is a phase rotation factor in the second phase rotation factor set.

S103. Generate side information based on the first phase rotation factor and the second phase rotation factor.

S104. Obtain a side information modulation signal. The side information is mapped to the first subcarrier. The side information modulation signal is obtained based on the mapped side information.

S105. Generate a to-be-transmitted signal. The to-be-transmitted signal is obtained by superposing the side information modulation signal, the first modulation signal, and the second modulation signal.

For example, in step S101, a length of the first-type data sub-block and the second-type data sub-block is equal to a length of the to-be-transmitted data. The first-type data sub-block and the second-type data sub-block each include N/V pieces of data. Remaining subcarrier locations are filled with zero (that is, remaining (N−N/V) data locations of each of the first data sub-block and the second data sub-block are filled with zero). Herein, N is the length of the to-be-transmitted data, and V is a sum of a quantity of first-type data sub-blocks and a quantity of second-type data sub-blocks included in the to-be-transmitted data. In step S102, the phase rotation factor used by the first-type data sub-block and that used by the second-type data sub-block are determined, and the modulation signals are obtained through multiplying the first-type data sub-block and the second-type data sub-block respectively by the phase rotation factors. Herein, using the phase rotation factors, a peak-to-average power ratio PAPR value of the to-be-transmitted data is minimized.

Optionally, the method further includes: S101a. Before the first modulation signal and the second modulation signal are obtained, perform IDFT on the first data sub-block and the second data sub-block, to obtain the first data sub-block obtained after the IDFT and the second data sub-block obtained after the IDFT.

The side information modulation signal is obtained after IDFT is performed on the mapped side information.

Optionally, the method further includes: S101b. Determine a power allocation factor of the first-type data sub-block based on information such as a channel status and a constellation mapping manner.

For example, the first phase rotation factor set may be $\{+1, -1, +i, -i\}$ or a subset of $\{+1, -1, +i, -i\}$. Herein, i is a square root of −1.

For example, the second phase rotation factor set may be $\{e^{(i\pi/4)}, e^{(i3\pi/4)}, e^{(i5\pi/4)}, e^{(i7\pi/4)}\}$ or a subset of $\{e^{(i7\pi/4)}, e^{(i3\pi/4)}, e^{(i5\pi/4)}, e^{(i7\pi/4)}\}$. Herein, i is a square root of −1.

Optionally, the method further includes: S104a. Determine a power allocation factor of the side information modulation signal based on information such as a channel status and a constellation mapping manner.

Optionally, the method further includes: S102a. Perform serial-to-parallel conversion on the to-be-transmitted data, and perform IDFT on the first-type data sub-block and the second-type data sub-block.

The foregoing step numbers are merely used to show differences between steps, and do not constitute a limitation on a sequence of steps. Execution according to the step sequence numbers in this embodiment is merely an optimal possible implementation.

Figure 4:
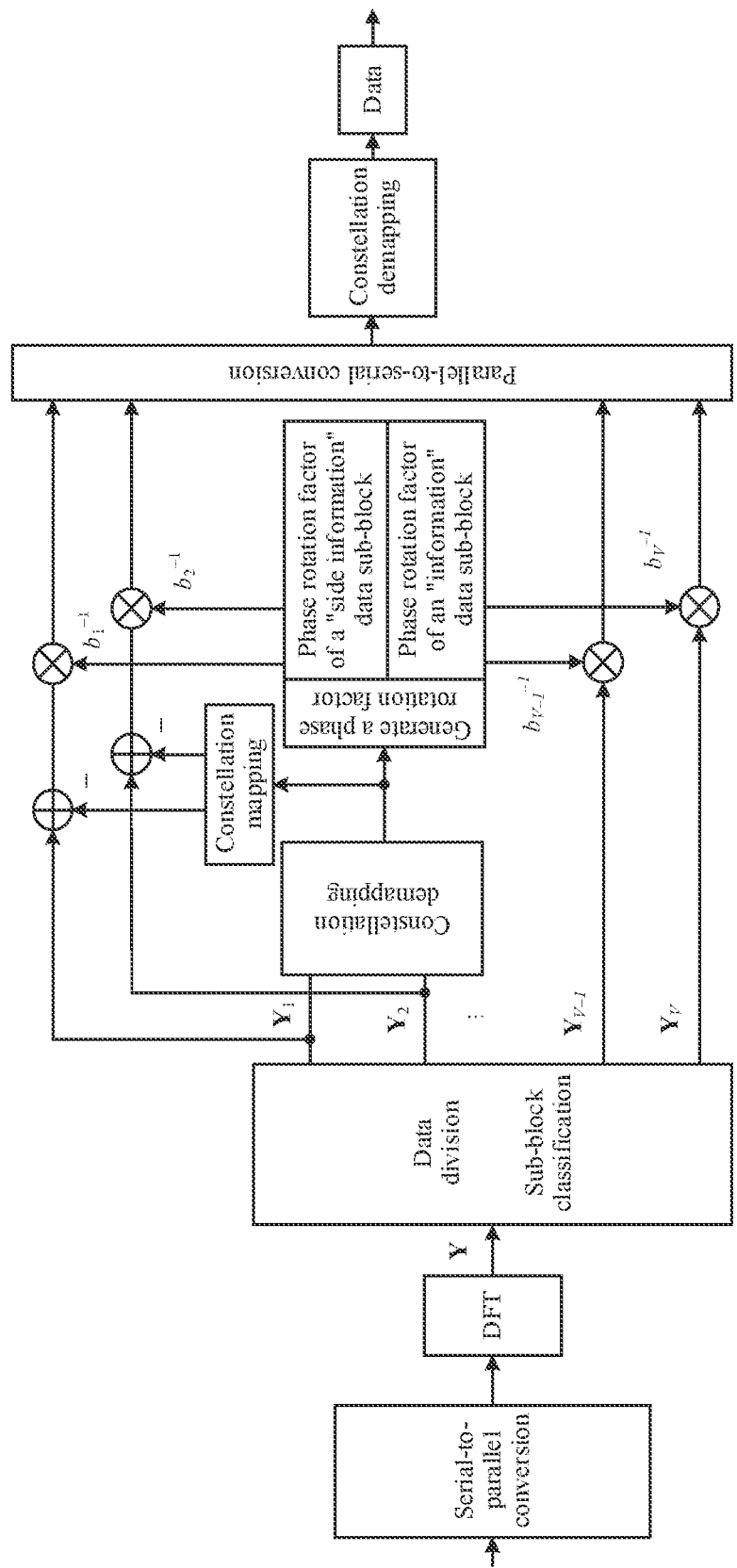
FIG. 4 is a schematic flowchart of a side information transmission method based on a partial transmit sequence technology on a receive end according to this application.

In correspondence with the side information transmission method provided in this application, this application further provides a side information reception method based on a partial transmit sequence technology. FIG. 4 is a schematic flowchart of a receive end in the method. The method may be applied to a signal receiving device or apparatus, or a receive-end apparatus such as a processing module or a chip required for receiving a signal. A procedure of the receive end includes: serial-to-parallel conversion, DFT, data segmentation, data sub-block classification, constellation demapping, constellation mapping, phase factor processing, parallel-to-serial conversion, and the like. A storage flowchart is not shown. However, it is easy to understand that related data needs to be temporarily stored before further calculation or processing.

Figure 5:
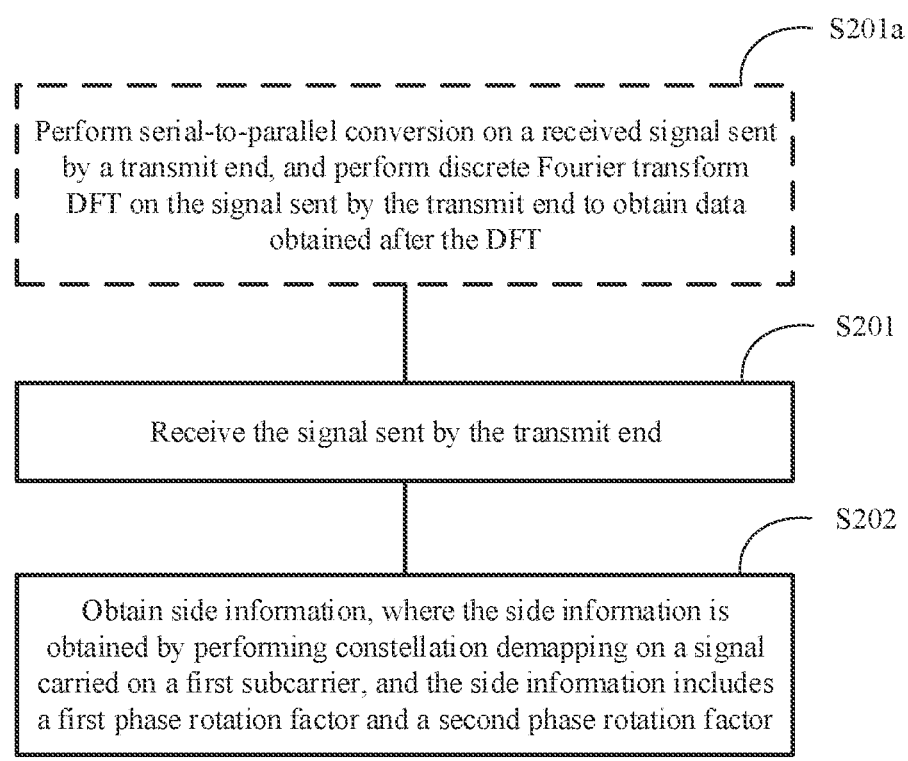
FIG. 5 is a block diagram of a side information reception method based on a partial transmit sequence technology according to this application.

FIG. 5 is a block diagram of a side information reception method based on a partial transmit sequence technology according to this application. The method is mainly performed by a receive end. The method mainly includes the following steps.

S201. Receive a signal sent by a transmit end. The signal sent by the transmit end includes first data sub-block information, second data sub-block information, and side information. The first data sub-block information and the side information are carried on a first subcarrier. The second data sub-block information is carried on a second subcarrier.

S202. Obtain side information. The side information is obtained by performing constellation demapping on a signal carried on the first subcarrier. The side information includes a first phase rotation factor and a second phase rotation factor.

It can be learned that, first, a phase rotation factor is selected, such that a PAPR value of a multicarrier signal can be minimized. The side information including the phase rotation factors is superposed on the carrier of the first-type data sub-block for transmission without additionally occupying a spectrum resource. In addition, it is verified through simulation experiments that this solution has better decoding performance than the current technology.

Optionally, the method further includes: S201a. Perform serial-to-parallel conversion on the received signal sent by the transmit end, and perform DFT on the signal sent by the transmit end to obtain data obtained after the DFT.

Optionally, a length of the first data sub-block information and the second data sub-block information is equal to a length of the data obtained after the DFT. The first data sub-block information and the second data sub-block information each include N/V pieces of data. Herein, N is the length of the signal sent by the transmit end, V is a quantity of pieces of the first data sub-block information and the second data sub-block information included in the signal sent by the transmit end, and / represents a division sign.

Figure 6:
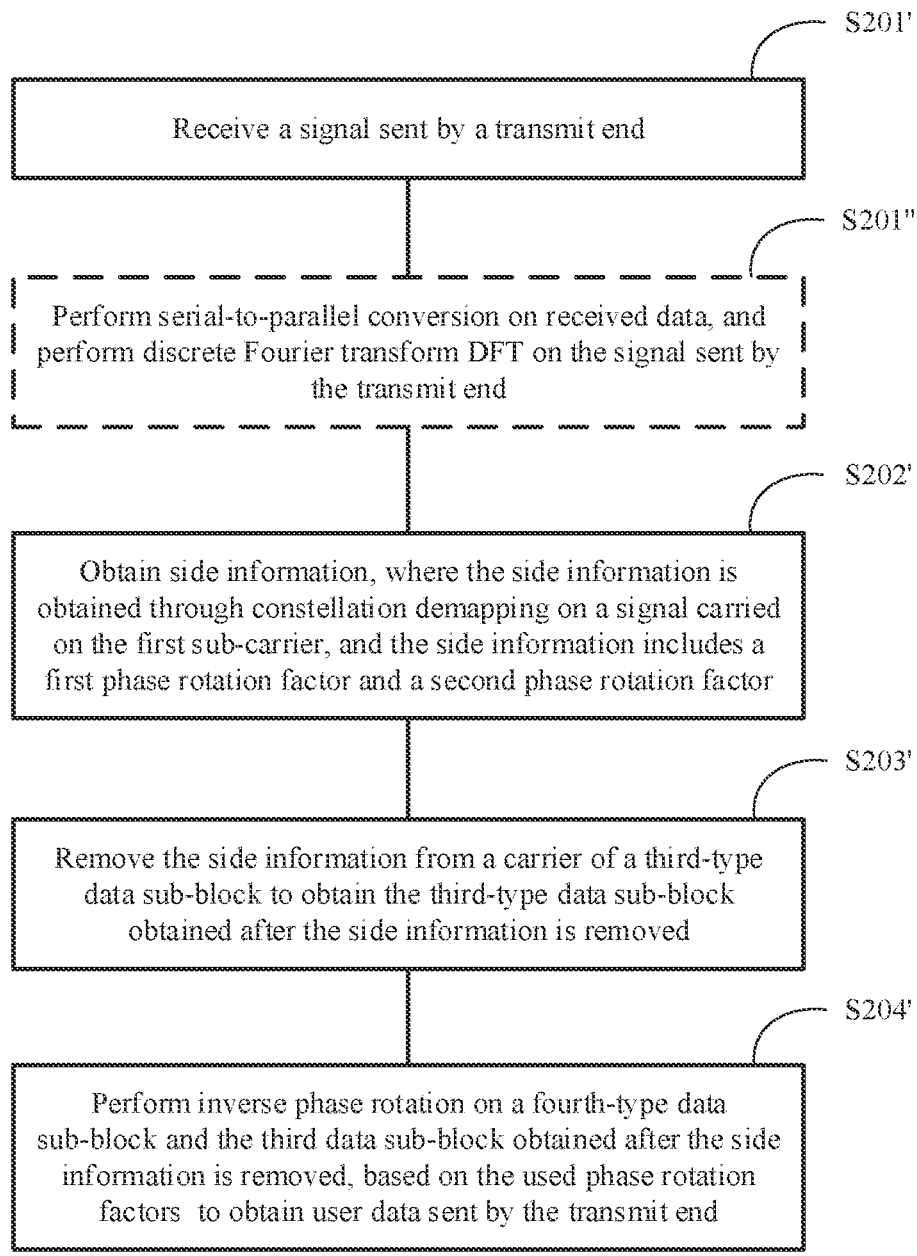
FIG. 6 is a block diagram of another side information reception method based on a partial transmit sequence technology according to this application.

FIG. 6 is a block diagram of another side information reception method based on a partial transmit sequence technology according to this application. The method is mainly performed by a receive end. The method mainly includes the following steps.

S201'. Receive a signal sent by a transmit end. The signal sent by the transmit end includes at least one third-type data sub-block and at least one fourth-type data sub-block. A phase rotation factor in a first phase rotation factor set is selected for the third-type data sub-block to perform phase rotation. A phase rotation factor in a second phase rotation factor set is selected for the fourth-type data sub-block to perform phase rotation. A carrier of the third-type data sub-block is further used to transmit side information.

S202'. Perform constellation demapping on the third-type data sub-block to obtain the side information. The side information is used to determine phase rotation factors used by the transmit end.

S203'. Remove the side information from the carrier of the third-type data sub-block to obtain the third-type data sub-block obtained after the side information is removed.

S204'. Perform inverse phase rotation on the fourth-type data sub-block and the third data sub-block obtained after the side information is removed, based on the phase rotation factors used by the transmit end to obtain user data sent by the transmit end.

For example, the signal sent by the transmit end is received. That the signal sent by the transmit end includes at least one third-type data sub-block and at least one fourth-type data sub-block is as follows.

A length of the third-type data sub-block and the fourth-type data sub-block is equal to a length of the signal sent by the transmit end. The third-type data sub-block and the fourth-type data sub-block each include N/V pieces of data. Herein, N is the length of the signal sent by the transmit end, V is a quantity of third-type data sub-blocks and fourth-type data sub-blocks included in the signal sent by the transmit end, and / represents a division sign.

Optionally, the method further includes: S201". Perform serial-to-parallel conversion on the received data, and perform DFT on the signal sent by the transmit end.

Figure 7:
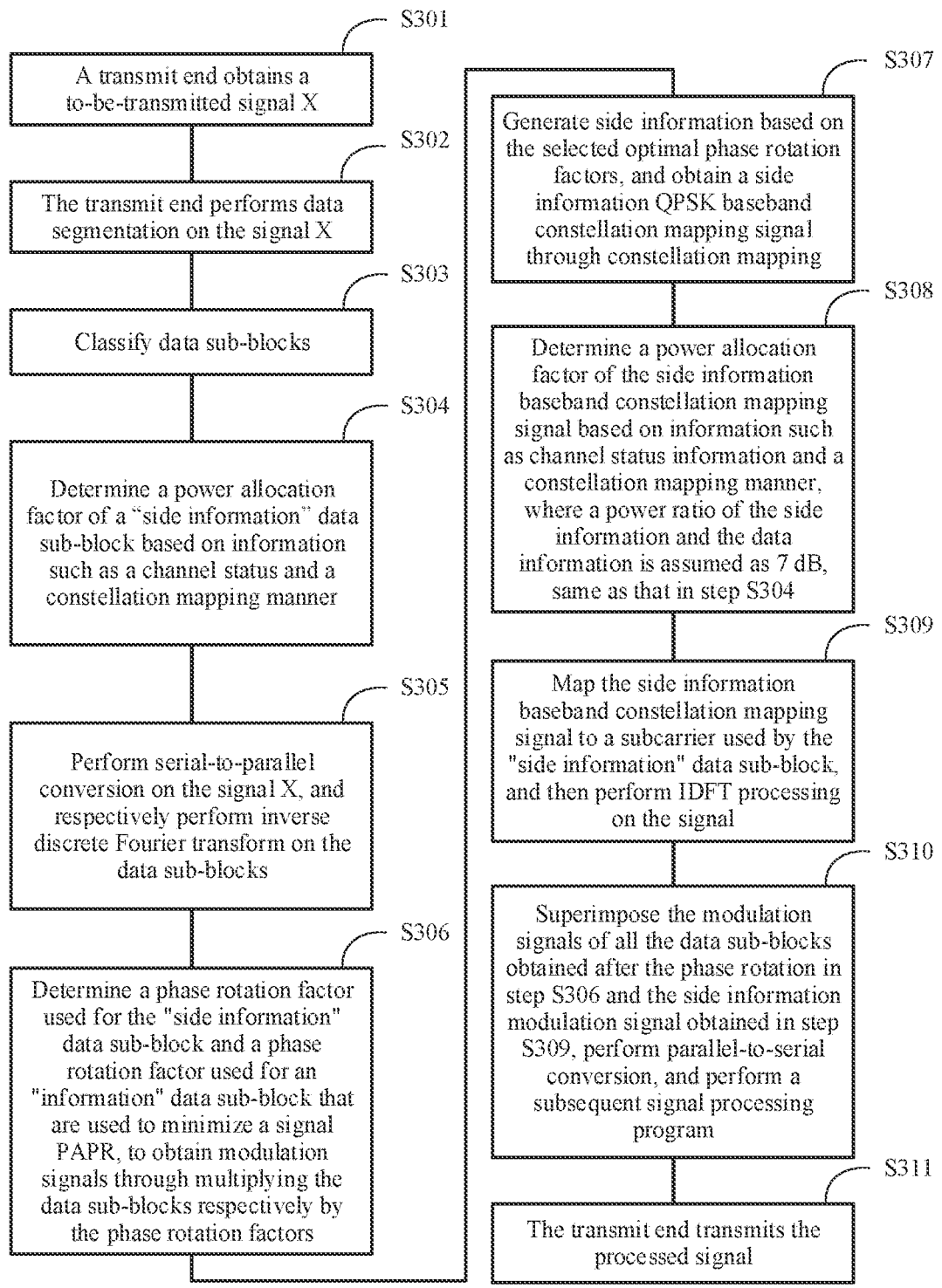
FIG. 7 is a schematic flowchart of a side information transmission method according to another embodiment of this application.

FIG. 7 is a schematic flowchart of a side information transmission method according to another embodiment of this application. The method is applied to a signal transmit end or a signal sending apparatus. Steps are respectively described in detail below.

S301. A transmit end obtains a to-be-transmitted signal X.

For example, in this embodiment, data is processed using a constellation mapping module, such that the transmit end obtains a quadrature phase shift keying (QPSK) baseband constellation mapping signal $X=[x_0, x_1, \ldots, x_{255}]$ with a length of N=256. Optionally, the QPSK baseband constellation mapping signal $X=[x_0, x_1, \ldots, x_{255}]$ with the length of N=256 in this step is merely used as an example for description. It is easy to understand that the signal length and a modulation mapping relationship do not constitute actual limitation.

S302. The transmit end performs data segmentation on the signal X.

Data segmentation is performed on the signal X, to obtain V (V is a positive integer) sub-blocks. For example, in this embodiment, the signal X is segmented into four data sub-blocks, where V=4. The sub-blocks are respectively: $X_1=[x_0, x_1, \ldots, x_{63}, 0, \ldots, 0, 0]$, $X_2=[0, 0, \ldots, 0, x_{64}, x_{65}, \ldots, x_{127}, 0, \ldots, 0, 0]$, $X_3=[0, 0, \ldots, 0, x_{128},$ $x_{129}, \ldots, x_{191}, 0, \ldots, 0, 0]$, and $X_4=[0, 0, \ldots, 0, x_{192},$ $x_{193}, \ldots, x_{255}]$. Each sub-block includes N/V=64 pieces of data. Remaining subcarrier locations are filled with zero, such that a length of each data sub-block is equal to the length of the signal X. This application does not limit a segmentation method for the signal X. The segmentation method may further be extracting data according to a rule. It may be learned that, in this embodiment, the segmentation method is a method based on a sequence to sequentially extract the same volume of data. In addition, volumes of data included in data sub-blocks obtained after segmentation in this application may also be different. This is not further described using an example.

S303. Classify data sub-blocks.

The data sub-blocks obtained after the segmentation are classified into two types based on used phase rotation pre-selection pools: a first-type data sub-block and a second-type data sub-block. For example, the data sub-blocks are classified into a "side information" data sub-block (the first-type data sub-block) and an "information" data sub-block (the second-type data sub-block). Side information and the first-type data sub-block are carried on the same carrier. Herein, $X_1$ is selected as a "side information" data sub-block, and a phase rotation factor in a side information phase rotation pre-selection pool is used for $X_1$ to perform phase rotation; and $X_2$, $X_3$, and $X_4$ are selected as "information" data sub-blocks, and a phase rotation factor in a data information phase rotation pre-selection pool is used for $X_2$, $X_3$, and $X_4$ to perform phase rotation. The side information phase rotation pre-selection pool is $\{+1, -1, +i, -i\}$. The data information phase rotation pre-selection pool may include any phase factor. Herein, $\{e^{(i\pi/4)}, e^{(i3\pi/4)}, e^{(i5\pi/4)}, e^{(i7\pi/4)}\}$ is used as an example. An element and a quantity of elements in the side information phase rotation pre-selection pool may be determined based on another factor, for example, $\{+0.5, -0.5, +0.8, -0.8, +0.2i, -0.2i, +0.6i, -0.6i\}$. Generally, more elements in the phase rotation pre-selection pool indicate better performance. To obtain better PAPR suppression performance, the data information phase rotation pre-selection pool needs to be expanded, for example, $\{+1, -1, +i, e^{(i\pi/4)}, e^{(i3\pi/4)}, e^{(i5\pi/4)}, e^{(i7\pi/4)}\}$.

S304. Determine a power allocation factor of the "side information" data sub-block based on information such as a channel status and a constellation mapping manner.

For example, in this embodiment, a power ratio of the "side information" data sub-block and the "information" data sub-block is set to 7 decibels (dB).

S305. Perform serial-to-parallel conversion on the signal X, and separately perform inverse discrete Fourier transform (IDFT) processing on the data sub-block.

S306. Determine a phase rotation factor used for the "side information" data sub-block and a phase rotation factor used for the "information" data sub-block that are used to minimize the signal PAPR, to obtain modulation signals through multiplying the data sub-blocks respectively by the phase rotation factors.

Herein, the phase rotation factor in the "side information phase rotation pre-selection pool" is used for the "side information" data sub-block to perform phase rotation, and the phase rotation factor in the "data information phase rotation pre-selection pool" is used for the "information" data sub-block to perform phase rotation. All combinations of phase rotation factors are traversed. A combination of phase rotation factors that are used to minimize the signal PAPR is selected to send a signal.

S307. Generate side information based on the selected optimal phase rotation factors, and obtain a side information QPSK baseband constellation mapping signal through constellation mapping.

S308. Determine a power allocation factor of the side information baseband constellation mapping signal based on information such as channel status information and a constellation mapping manner, where a power ratio of the side information and the data information is assumed as 7 dB, same as that in step S304.

S309. Map the side information baseband constellation mapping signal to a subcarrier used by the "side information" data sub-block, and then perform IDFT processing on the signal.

S310. Superimpose the modulation signals of all the data sub-blocks obtained after the phase rotation in step S306 and the side information modulation signal obtained in step S309, perform parallel-to-serial conversion, and perform a subsequent signal processing program, for example, digital-to-analog conversion, cyclic prefix addition, up-conversion, and a high-power amplifier.

S311. The transmit end transmits the processed signal.

Figure 8:
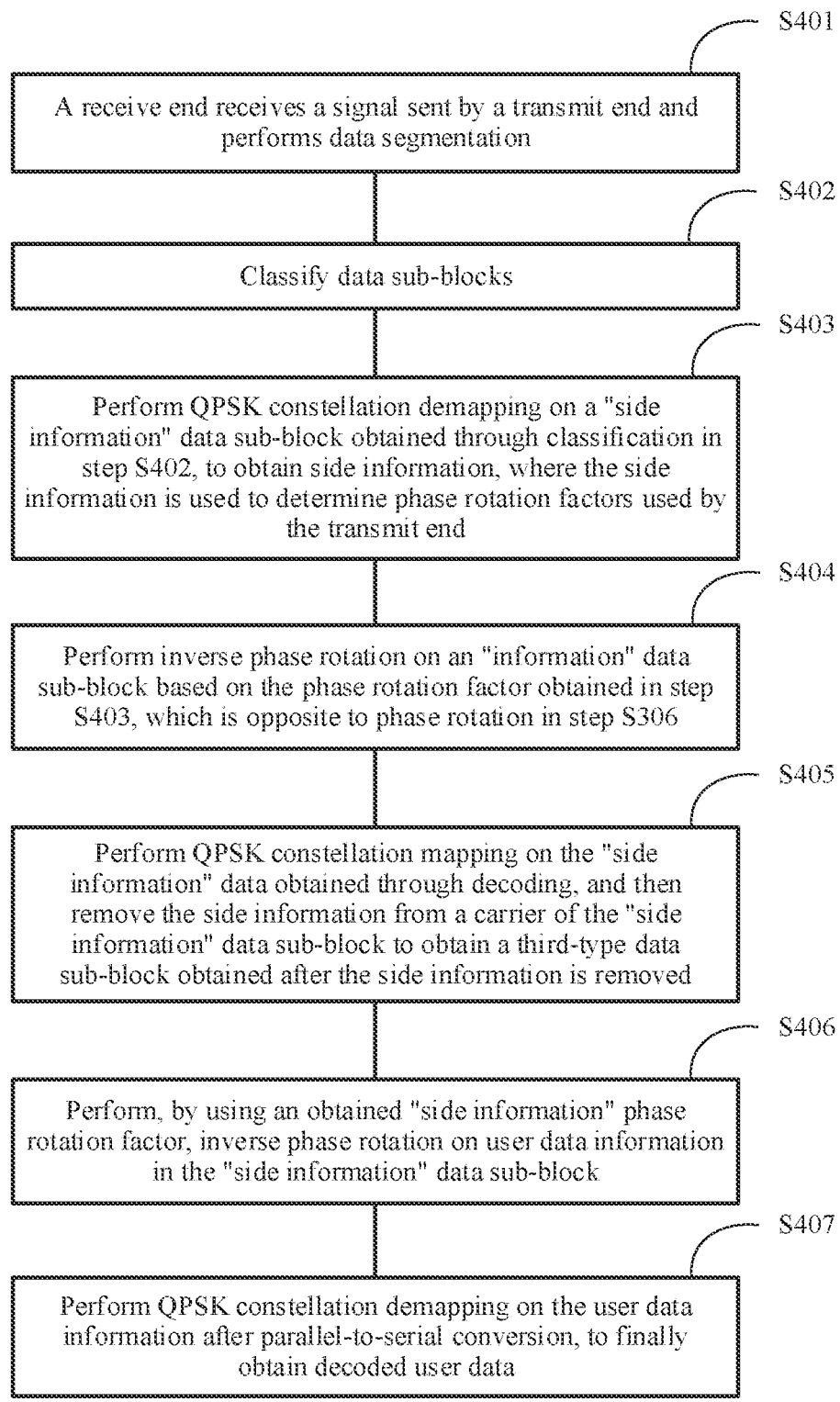
FIG. 8 is a schematic flowchart of a side information reception method according to another embodiment of this application.

FIG. 8 is a schematic flowchart of a side information reception method according to another embodiment of this application. The method is applied to a signal receive end or a signal receiving apparatus. A parameter in the method is consistent with that in the embodiment in FIG. 7. Steps are respectively described in detail below.

S401. A receive end receives a signal sent by a transmit end and performs data segmentation.

For example, the receive end performs processing such as down-conversion, an analog-to-digital converter, and cyclic prefix removal on the received signal, performs discrete Fourier transform (DFT) processing on a digital baseband signal to obtain a signal Y, and performs data segmentation on the signal Y. For example, in this embodiment, step S401 corresponds to step S102 in the embodiment shown in FIG. 6. The signal Y is segmented into V=4 sub-blocks. Data included in the sub-blocks is respectively $Y_1=[y_0, y_1, \ldots, y_{63}, 0, \ldots, 0]$, $Y_2=[0, 0, \ldots, 0, y_{64}, y_{65}, \ldots, y_{127}, 0, \ldots, 0, 0]$, $y_3=[0, 0, \ldots, 0, y_{128}, y_{129}, \ldots, y_{191}, 0, \ldots, 0, 0]$, and $Y_4=[0, 0, \ldots, 0, y_{192}, y_{193}, \ldots, y_{255}]$. Each sub-block includes N/V=64 pieces of data. A length of the data sub-block is N. It may be understood that signal data segmentation methods in different embodiments need to be agreed with a transmit end. The data segmentation method may be agreed in advance, or the data segmentation manner is sent to the receive end using signaling.

S402. Classify data sub-blocks.

The data sub-blocks obtained after the segmentation are classified into two types based on used phase rotation pre-selection pools: a third-type data sub-block and a fourth-type data sub-block. This is similar to step S303. The data sub-blocks obtained in step S402 are classified into: (1) a data sub-block (the third-type data sub-block) using a phase rotation factor in a "side information phase rotation pre-selection pool" to perform phase rotation: $Y_1$, and (2) a data sub-block (the fourth-type data sub-block) using a phase rotation factor in a "data information phase rotation pre-selection pool" to perform phase rotation: $Y_2$, $Y_3$, and $Y_4$. A carrier of the third-type data sub-block further carries side information. Further, in different embodiments, data sub-block classification methods also need to be agreed with the transmit end. Alternatively, data sub-block classification methods are distinguished using labels of classified sub-blocks. A range of the side information phase rotation pre-selection pool and a range of the data information phase rotation pre-selection pool in this step are the same as the ranges of the pre-selection pools determined in step S303.

S403. Perform QPSK constellation demapping on the "side information" data sub-block obtained through classification in step S402, to obtain the side information. The side information is used to determine phase rotation factors used by the transmit end.

S404. Perform inverse phase rotation on the "information" data sub-block based on the phase rotation factor obtained in step S403. This is opposite to the phase rotation in step S306.

S405. Perform QPSK constellation mapping (channel encoding, which is omitted herein) on the "side information" data obtained through decoding in step S403, and then remove the side information from a carrier of the "side information" data sub-block to obtain user data information (the third-type data sub-block obtained after the side information is removed) in the "side information" data sub-block.

S406. Perform, using the obtained "side information" phase rotation factor, inverse phase rotation on the user data information in the "side information" data sub-block.

S407. Perform QPSK constellation demapping (and channel decoding, which is omitted herein) on the user data information after parallel-to-serial conversion, to finally obtain decoded user data.

The foregoing step sequence numbers are merely used to indicate step numbers, and do not limit a sequence of steps. A step with a small step number may be performed after a step with a large step number. For example, step S404 may be performed after step S405.

Figure 9:
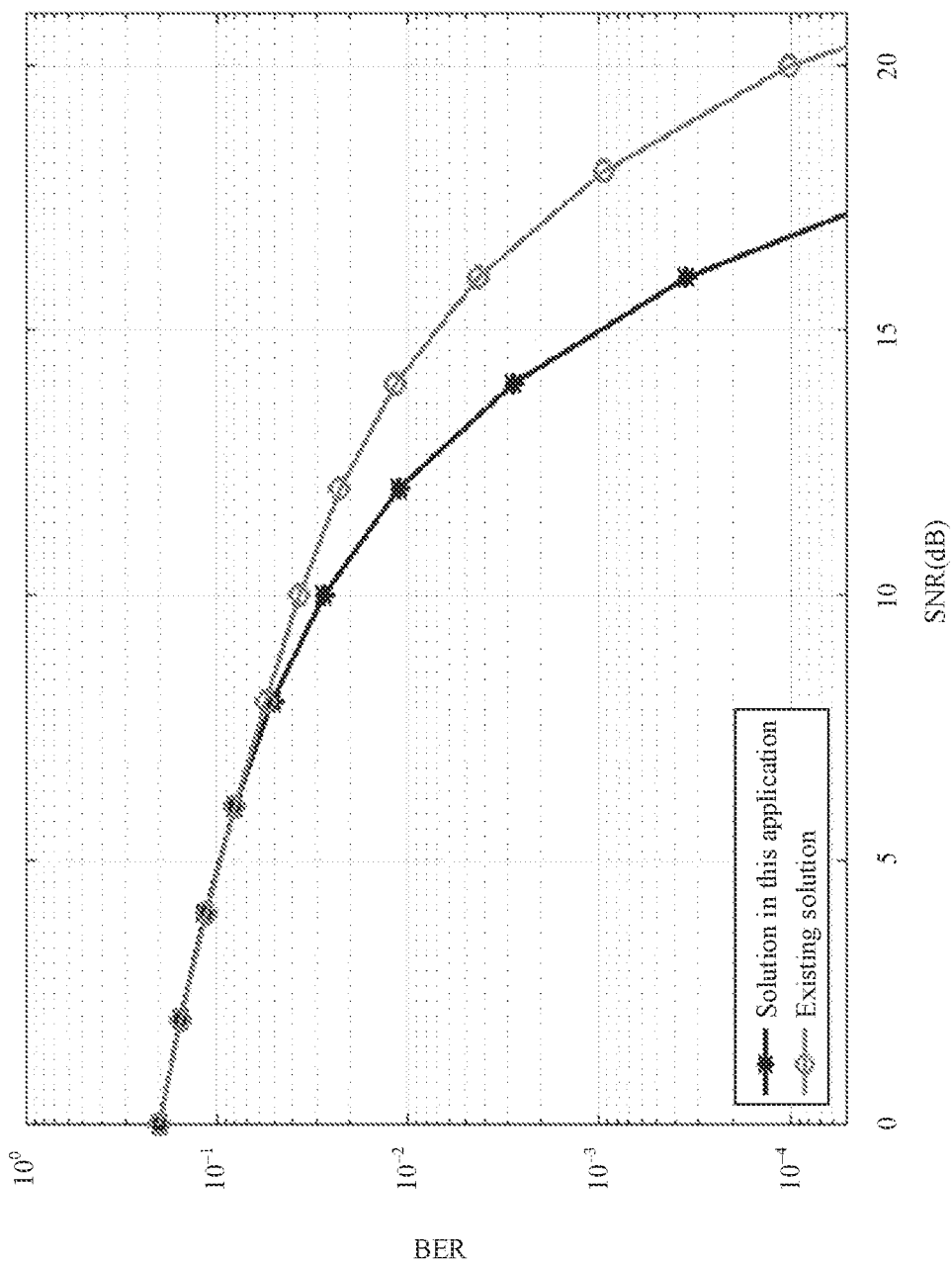
FIG. 9 shows simulation comparison of BER performance between a side information transmission method provided in this application and the current technology.

FIG. 9 is simulation comparison of BER performance between a side information transmission method provided in this application and the current technology. A black line represents BER performance of the side information transmission method provided in this application, and a gray line represents BER performance of the current technology. A method used in the current technology is to superimpose an identification sequence (a selected phase factor) to an obtained sequence (a processed data sequence) to be sent together. However, the method does not include data classification and does not limit a phase rotation pre-selection pool. In this method, the following case is avoided: A sub-channel is exclusively occupied to transmit the side information. However, transmission reliability of the side information is limited. It can be learned from the simulation result shown in FIG. 9 that better BER performance can be achieved in this application than the current technology.

Figure 10:
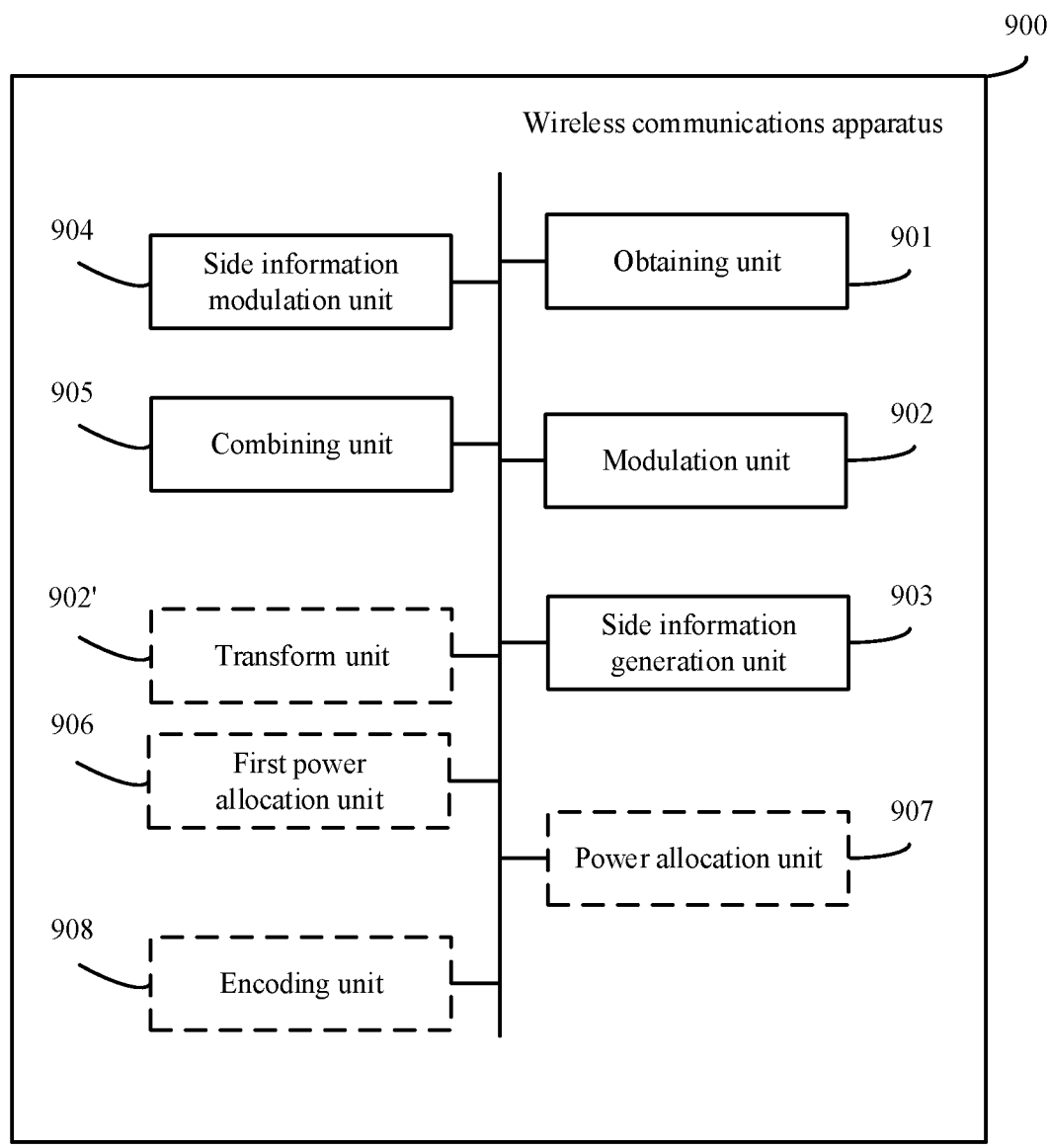
FIG. 10 is a schematic structural diagram of a wireless communications apparatus 900 according to this application.

FIG. 10 is a schematic structural diagram of a wireless communications apparatus 900 according to this application. The wireless communications apparatus 900 includes an obtaining unit 901, a modulation unit 902, a side information generation unit 903, a side information modulation unit 904, and a combination unit 905.

The obtaining unit 901 is configured to obtain to-be-transmitted data. The to-be-transmitted data includes at least one first data sub-block and at least one second data sub-block. The first data sub-block is carried on a first subcarrier. The second data sub-block is carried on a second subcarrier.

The modulation unit 902 is configured to obtain a first modulation signal and a second modulation signal. The first modulation signal is obtained based on a first phase rotation factor. The second modulation signal is obtained based on a second phase rotation factor. The first phase rotation factor is a phase rotation factor in a first phase rotation factor set. The second phase rotation factor is a phase rotation factor in a second phase rotation factor set.

The side information generation unit 903 is configured to generate side information based on the first phase rotation factor and the second phase rotation factor.

The side information modulation unit 904 is configured to obtain a side information modulation signal. The side information is mapped to the first subcarrier. The side information modulation signal is obtained based on the mapped side information.

The combination unit 905 is configured to generate a to-be-transmitted signal. The to-be-transmitted signal is obtained by superposing the side information modulation signal, the first modulation signal, and the second modulation signal.

For example, the to-be-transmitted data is obtained. That the to-be-transmitted data includes the at least one first-type data sub-block and the at least one second-type data sub-block is as follows: A length of the first-type data sub-block and the second-type data sub-block is equal to a length of the to-be-transmitted data. The first-type data sub-block and the second-type data sub-block each include N/V pieces of data. Remaining (N−N/V) data locations of each the first data sub-block and the second data sub-block are filled with zero. Herein, N is the length of the to-be-transmitted data, V is a sum of a quantity of first-type data sub-blocks and a quantity of second-type data sub-blocks included in the to-be-transmitted data, and/represents a division sign.

Optionally, the apparatus further includes a transform unit 902' configured to: before the first modulation signal and the second modulation signal are obtained, perform IDFT on the first data sub-block and the second data sub-block, to obtain the first data sub-block obtained after the IDFT and the second data sub-block obtained after the IDFT.

Optionally, the apparatus further includes a first power allocation unit 906 configured to determine a power allocation factor of the first-type data sub-block based on information such as a channel status and a constellation mapping manner.

For example, the first phase rotation factor set is $\{+1, -1, +i, -i\}$ or a subset of $\{+1, -1, +i, -i\}$. Herein, i is a square root of −1.

Optionally, the apparatus further includes a power allocation unit 907 configured to determine a power allocation factor of the side information modulation signal based on information such as a channel status and a constellation mapping manner.

Optionally, the apparatus further includes an encoding unit 908 configured to perform channel encoding and serial-to-parallel conversion on the to-be-transmitted data.

Figure 11:
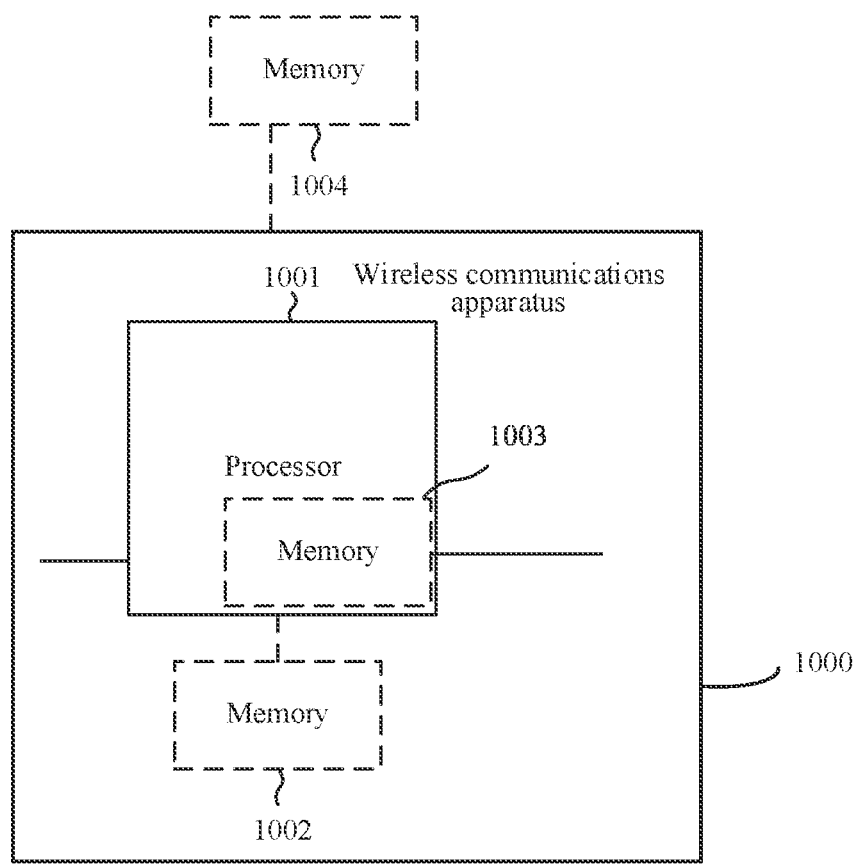
FIG. 11 is a schematic structural diagram of another wireless communications apparatus 1000 according to this application.

A part or all of the side information transmission method or the side information reception method described in the foregoing embodiments may be implemented using hardware or software. When the method is implemented using software, FIG. 11 is a schematic structural diagram of another wireless communications apparatus 1000 according to this application. The wireless communications apparatus 1000 includes a processor 1001; and a memory 1002, a memory 1003, or a memory 1004.

The processor 1001 is configured to execute a program stored in the memory 1002, the memory 1003, or the memory 1004. When the program is executed, the apparatus is enabled to execute the method in any one of the foregoing embodiments.

The memory 1002, the memory 1003, or the memory 1004 may store data generated or used by the processor 1001 in a process of performing an encoding method. For example, the memory is a cache. It is easy to understand that the memory may be a physically independent unit, or may be storage space on a cloud server, a network hard disk, or the like.

Optionally, the memory 1002 is located in the apparatus.

Optionally, the memory 1003 and the memory 1001 are integrated.

Optionally, the memory 1004 is disposed outside the apparatus.

The processor 1001 may be a central processing unit (CPU), a network processor (NP), a combination of a CPU and an NP, or a cloud computing platform.

The processor 1001 may alternatively be a hardware chip, or may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory (or a storage unit) in this embodiment of this application may include a volatile memory, for example, a random-access memory (RAM). The memory may also include a non-volatile memory, for example, a flash memory, a hard disk drive (HDD), a solid-state drive (SSD), cloud storage, network attached storage (NAS), or a network drive. The memory may further include a combination of the foregoing types of memories, or another medium or product in any form with a storage function.

Optionally, the apparatus is a base station or a terminal.

Optionally, the apparatus may be a chip or an integrated circuit.

Figure 12:
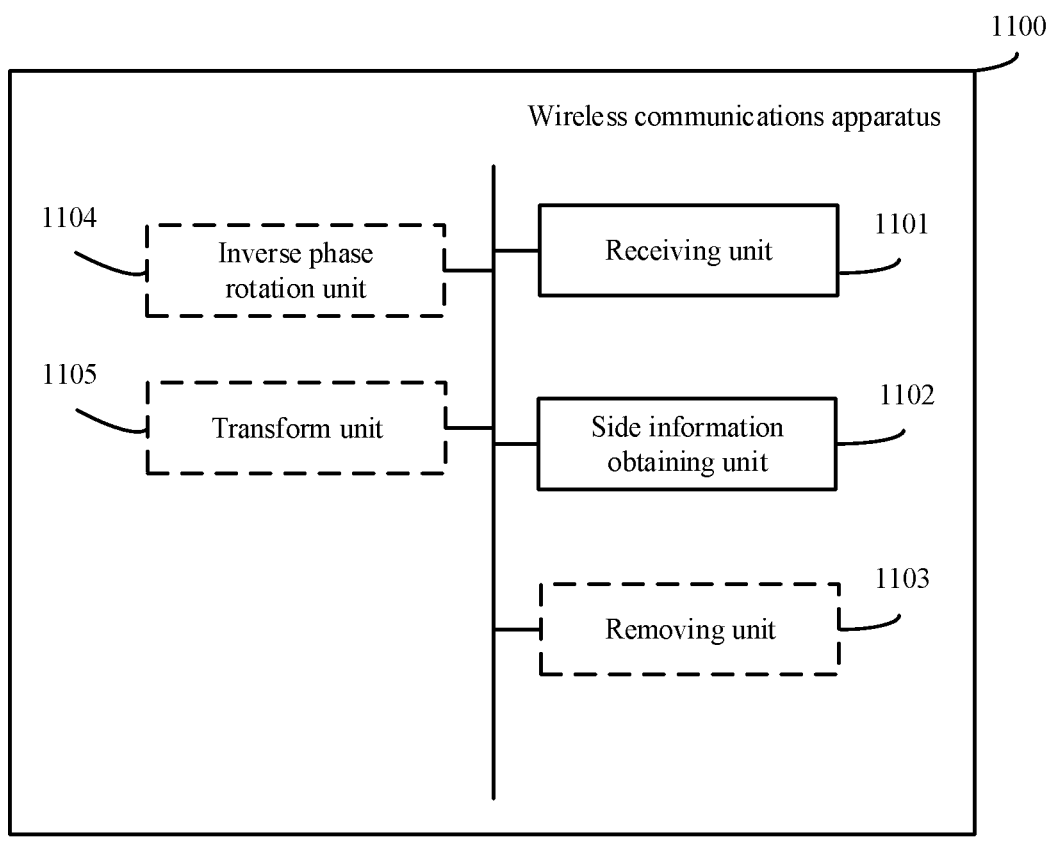
FIG. 12 is a schematic structural diagram of a wireless communications apparatus 1100 according to this application.

FIG. 12 is a schematic structural diagram of a wireless communications apparatus 1100 according to this application. The wireless communications apparatus 1100 includes a receiving unit 1101, a side information obtaining unit 1102, a removing unit 1103, and an inverse phase rotation unit 1104.

The receiving unit 1101 is configured to receive a signal sent by a transmit end. The signal sent by the transmit end includes first data sub-block information, second data sub-block information, and side information. The first data sub-block information and the side information are carried on a first subcarrier. The second data sub-block information is carried on a second subcarrier.

The side information obtaining unit 1102 is configured to obtain the side information. The side information is obtained by performing constellation demapping on a signal carried on the first subcarrier. The side information includes a first phase rotation factor and a second phase rotation factor.

Optionally, the removing unit 1103 is configured to remove the side information from the first subcarrier to obtain the first data sub-block information.

Optionally, the inverse phase rotation unit 1104 is configured to perform inverse phase rotation on the first data sub-block and the second data sub-block based on the phase rotation factors used by the transmit end to obtain data sent by the transmit end.

For example, the signal sent by the transmit end is received. That the signal sent by the transmit end includes at least one first data sub-block and at least one second data sub-block is as follows.

A length of the first data sub-block information and the second data sub-block information is equal to a length of the data obtained after the DFT. The first data sub-block information and the second data sub-block information each include N/V pieces of data. Herein, N is the length of the signal sent by the transmit end, V is a quantity of pieces of the first data sub-block information and the second data sub-block information included in the signal sent by the transmit end, and/represents a division sign.

Optionally, the apparatus further includes a transform unit 1105 configured to: perform serial-to-parallel conversion on the received signal sent by the transmit end, and perform DFT on the signal sent by the transmit end to obtain data obtained after the DFT.

An embodiment of this application further provides a computer readable medium. The computer readable medium stores computer program instructions. The computer program instructions are executed by a computer to implement the method in any foregoing embodiment.

An embodiment of this application further provides a computer program product. The computer program product is executed by a computer to implement the method in any embodiment.

An embodiment of this application further provides a communications system (not shown in the accompanying drawings), including any wireless communications apparatus on a transmit end and any wireless communications apparatus on a receive end according to an embodiment of this application. The wireless communications apparatus on the transmit end may be a network device (for example, a base station or a gNodeB), a terminal device, or any apparatus that uses the side information transmission method in the embodiments of this application. The wireless communications apparatus on the receive end may be a terminal device, a base station, or any apparatus that uses the side information reception method in the embodiments of this application. For example, the communications system includes a base station serving as the transmit end and a terminal serving as the receive end. Alternatively, the communications system includes a base station serving as the transmit end, and another base station or another network device serving as the receive end. Alternatively, the communications system includes a terminal serving as the transmit end and another terminal serving as the receive end. Alternatively, the communications system includes a terminal serving as the transmit end, and a base station serving as the receive end.

What is claimed is:

1. A side information transmission method, comprising:
   obtaining to-be-transmitted data, wherein the to-be-transmitted data comprises at least a first data sub-block carried on a first subcarrier and a second data sub-block carried on a second subcarrier;
   obtaining a first modulated signal and a second modulated signal based on a first phase rotation factor and a second phase rotation factor, wherein the first phase rotation factor is in a first phase rotation factor set and the second phase rotation factor is in a second phase rotation factor set;
   generating side information based on the first phase rotation factor and the second phase rotation factor;
   obtaining a side information modulated signal based on mapping the side information to the first subcarrier; and
   generating a to-be-transmitted signal by superposing the side information modulated signal, the first modulated signal, and the second modulated signal.

2. The side information transmission method according to claim 1, wherein before obtaining the first modulated signal and the second modulated signal, the side information transmission method further comprises performing an inverse discrete Fourier transform (IDFT) on the first data sub-block and the second data sub-block.

3. The side information transmission method according to claim 1, wherein obtaining the side information modulated signal, the side information transmission method further comprises performing an inverse discrete Fourier transform (IDFT) on the side information.

4. The side information transmission method according to claim 1, wherein a length of the first data sub-block and the second data sub-block is equal to a length of the to-be-transmitted data, wherein the first data sub-block and the second data sub-block each comprise N/V pieces of data, wherein remaining (N−N/V) data locations of each of the first data sub-block and the second data sub-block are filled with zero, wherein N is the length of the to-be-transmitted data, wherein V is a sum of a quantity of first data sub-blocks and a quantity of second data sub-blocks in the to-be-transmitted data, and wherein / represents a division sign.

5. The side transmission method according to claim 1, wherein the first phase rotation factor set is $\{+1, -1, +i, -i\}$ or a subset of $\{+1, -1, +i, -i\}$, and wherein i is a square root of $-1$.

6. The side information transmission method according to claim 1, further comprising determining a power allocation factor of the side information modulated signal based on a channel status and a constellation mapping manner.

7. A side information reception method, comprising:
   receiving a signal from a transmit end, wherein the signal comprises first data sub-block information, second data sub-block information, and side information, wherein the first data sub-block information and the side information are carried on a first subcarrier, and wherein the second data sub-block information is carried on a second subcarrier; and
   obtaining the side information by performing constellation demapping on a first signal carried on the first subcarrier, wherein the side information comprises a first phase rotation factor and a second phase rotation factor.

8. A wireless communications apparatus, comprising:
   a receiver configured to obtain to-be-transmitted data, wherein the to-be-transmitted data comprises at least a first data sub-block carried on a first subcarrier and a second data sub-block carried on a second subcarrier;
   a modulator configured to obtain a first modulated signal and a second modulated signal based on a first phase rotation factor and a second phase rotation factor, wherein the first phase rotation factor is in a first phase rotation factor set and the second phase rotation factor is in a second phase rotation factor set;
   a side information generator configured to generate side information based on the first phase rotation factor and the second phase rotation factor;
   a side information modulator configured to obtain a side information modulated signal based on mapping the side information to the first subcarrier; and
   a combiner configured to generate a to-be-transmitted signal by superposing the side information modulated signal, the first modulated signal, and the second modulated signal.

9. The wireless communication apparatus according to claim 8, further comprising a transformer configured such that before the first modulated signal and the second modulated signal are obtained, the transformer performs inverse discrete Fourier transform (IDFT) on the first data sub-block and the second data sub-block.

10. The wireless communications apparatus according to claim 8, wherein the side information modulated signal is obtained after inverse discrete Fourier transform (IDFT) is performed on the side information.

11. The wireless communications apparatus according to claim 8, wherein a length of the first data sub-block and the second data sub-block is equal to a length of the to-be-transmitted data, wherein the first data sub-block and the second data sub-block each comprise N/V pieces of data, wherein remaining (N−N/V) data locations of each of the first data sub-block and the second data sub-block are filled with zero, wherein N is the length of the to-be-transmitted data, wherein V is a sum of a quantity of first data sub-blocks and a quantity of second data sub-blocks in the to-be-transmitted data, and wherein / represents a division sign.

12. The wireless communications apparatus according to claim 8, wherein the first phase rotation factor set is {+1, −1, +i, −i} or a subset of {+1, −1, +i, −i} wherein i is a square root of −1.

13. The wireless communications apparatus according to claim 8, further comprising a power allocator configured to determine a power allocation factor of the side information modulated signal based on a channel status and a constellation mapping manner.

14. A wireless communications apparatus, comprising:
a memory configured to store program instructions; and
a processor coupled to the memory and configured to execute the program instructions to the wireless communications apparatus to:
obtain to-be-transmitted data, wherein the to-be-transmitted data comprises at least a first data sub-block carried on a first subcarrier and a second data sub-block carried on a second subcarrier;
obtain a first modulated signal based on a first phase rotation factor in a first phase rotation factor set;
obtain a second modulated signal based on a second phase rotation factor in a second phase rotation factor set;
generate side information based on the first phase rotation factor and the second phase rotation factor;
obtain a side information modulated signal based on mapping the side information to the first subcarrier; and
generate a to-be-transmitted signal, wherein the to-be-transmitted signal is obtained by superposing the side information modulated signal, the first modulated signal, and the second modulated signal.

15. The wireless communications apparatus according to claim 14, wherein the memory is disposed outside the wireless communications apparatus.

16. A non-transitory computer-readable medium comprising computer program instructions that, when run on a computer, cause the computer to perform a side information transmission method comprising:
obtaining to-be-transmitted data, wherein the to-be-transmitted data comprises at least a first data sub-block carried on a first subcarrier and a second data sub-block carried on a second subcarrier;
obtaining a first modulated signal and a second modulated signal based on a first phase rotation factor and a second phase rotation factor, wherein the first phase rotation factor is in a first phase rotation factor set and the second phase rotation factor is in a second phase rotation factor set;
generating side information based on the first phase rotation factor and the second phase rotation factor;
obtaining a side information modulated signal based on mapping the side information to the first subcarrier; and
generating a to-be-transmitted signal by superposing the side information modulated signal, the first modulated signal, and the second modulated signal.

17. The non-transitory computer-readable medium according to claim 16, wherein before obtaining the first modulated signal and the second modulated signal, the side information transmission method further comprises performing inverse discrete Fourier transform (IDFT) on the first data sub-block and the second data sub-block.

18. The non-transitory computer-readable medium according to claim 16, wherein before obtaining the side information modulated signal, the side information transmission method further comprises performing inverse discrete Fourier transform (IDFT) on the side information.

19. The non-transitory computer-readable medium according to claim 16, wherein the first phase rotation factor set is {+1, −1, +i, −i} or a subset of {+1, −1, +i, −i}, and wherein i is a square root of −1.

20. The non-transitory computer-readable medium according to claim 16, wherein the side information transmission method further comprises determining a power allocation factor of the side information modulated signal based on a channel status and a constellation mapping manner.

* * * * *

UNITED STATES PATENT AND TRADEMARK OFFICE
CERTIFICATE OF CORRECTION

| | |
|---|---|
| PATENT NO. | : 11,695,609 B2 |
| APPLICATION NO. | : 17/514562 |
| DATED | : July 4, 2023 |
| INVENTOR(S) | : Xiaolu Wang et al. |

It is certified that error appears in the above-identified patent and that said Letters Patent is hereby corrected as shown below:

In the Claims

Claim 14, Column 19, Line 24: "instructions to the wireless" should read "instructions to cause the wireless"

Signed and Sealed this
Eighth Day of August, 2023

Katherine Kelly Vidal
*Director of the United States Patent and Trademark Office*